United States Patent
Kahn et al.

(10) Patent No.: US 7,369,660 B1
(45) Date of Patent: May 6, 2008

(54) METHODS AND APPARATUS FOR DISTRIBUTING DIGITAL CONTENT

(75) Inventors: Raynold M. Kahn, Los Angeles, CA (US); Gregory J. Gagnon, Torrance, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 916 days.

(21) Appl. No.: 10/441,505

(22) Filed: May 20, 2003

(51) Int. Cl.
*H04N 7/167* (2006.01)
(52) U.S. Cl. ..................................... 380/200
(58) Field of Classification Search ............. 380/200, 380/223, 278; 713/193
See application file for complete search history.

(56) References Cited

U.S. PATENT DOCUMENTS

| | | | |
|---|---|---|---|
| 5,715,315 A | 2/1998 | Handelman | |
| 5,936,660 A | 8/1999 | Gurantz | |
| 5,940,387 A | 8/1999 | Humpleman | |
| 6,286,142 B1 | 9/2001 | Ehreth | |
| 6,961,858 B2* | 11/2005 | Fransdonk | 726/29 |
| 7,035,827 B2* | 4/2006 | Ezaki | 705/51 |
| 7,124,938 B1* | 10/2006 | Marsh | 235/382 |
| 2002/0166056 A1* | 11/2002 | Johnson et al. | 713/193 |
| 2005/0005287 A1* | 1/2005 | Claussen | 725/31 |

* cited by examiner

*Primary Examiner*—Emmanuel Moise
*Assistant Examiner*—Ali S Abyaneh

(57) ABSTRACT

Methods and an apparatus for distributing digital content via a host receiver (e.g., direct-to-home satellite host receiver) are disclosed. The disclosed techniques include transmission of a host identifier and a client identifier from a host receiver and a client device to a satellite transmission station. The identifiers are used by the transmission station to lookup unique encryption keys associated with the host receiver and client device. The transmission station then transmits one or more encrypted keys to the host and/or client. In addition, the transmission station transmits encrypted content to the host. In turn, the host decrypts the content using one encryption key, re-encrypts the content using another encryption key, and passes the content along to the client device. By using the smart card, tuner, and/or storage device of the host receiver, the client device need not include a smart card, tuner, and/or storage device.

49 Claims, 10 Drawing Sheets

METHODS AND APPARATUS FOR DISTRIBUTING DIGITAL CONTENT

TECHNICAL FIELD

The present disclosure pertains to information distribution systems and, more particularly, to methods and apparatus for distributing digital content via a direct-to-home satellite host receiver.

BACKGROUND

Information distribution systems, such as cable and satellite television systems, including transmission stations and reception stations have become so prevalent that most consumers take them for granted. The wide bandwidth available in some digital information distribution systems allows content providers to provide viewers with vast amounts of programming content. For example, while past conventional analog cable television systems provided viewers with tens of channels, modern satellite television systems, such as, for example, the DIRECTV® system provides viewers with literally hundreds of choices of programming content.

However, one drawback of satellite television systems is the need for a separate satellite receiver "box" for each television set. Almost all modern televisions are equipped to tune a plurality of analog channels received from an analog cable or terrestrial broadcast system. However, most televisions are not equipped to decode any channels received from a digital satellite system. In order to adapt a television to receive and decode channels from a digital satellite system, a satellite receiver is connected to the television.

The need for a separate satellite receiver for each television in a household greatly increases the cost of a satellite television system. The satellite receiver typically includes a satellite connection, a tuner, a decoder, a conditional access smartcard, as well as many other components. Some satellite receivers also include a hard disk (or other mass storage device) to record content for subsequent viewing. As a result, the per television cost of a satellite system typically exceeds the per television cost of an analog cable system.

If the consumer is asked to bear theses costs, the consumer may avoid adding additional televisions to his/her satellite system, or the consumer may choose not to install a satellite system altogether. On the other hand, if the satellite system provider bears these costs, the provider may need to charge more money and/or make less profit.

DETAILED DESCRIPTION

Although the following discloses example systems including, among other components, software executed on hardware, it should be noted that such systems are merely illustrative and should not be considered as limiting. For example, it is contemplated that any or all of the disclosed hardware and software components could be embodied exclusively in dedicated hardware, exclusively in software, exclusively in firmware or in some combination of hardware, firmware and/or software.

In addition, while the following disclosure is made with respect to example DIRECTV® broadcast services and systems, it should be understood that many other delivery systems are readily applicable to the disclosed system. Such systems include wired or cable distribution systems, UHF/VHF radio frequency systems or other terrestrial broadcast systems (e.g., MMDS, LMDS, etc.), and fiber optic networks. One particular example system includes a digital cable system or any other suitable system in which information is distributed in a compressed format. Accordingly, while the following describes example systems and processes, persons of ordinary skill in the art will readily appreciate that the disclosed examples are not the only way to implement such systems.

Figure 1:
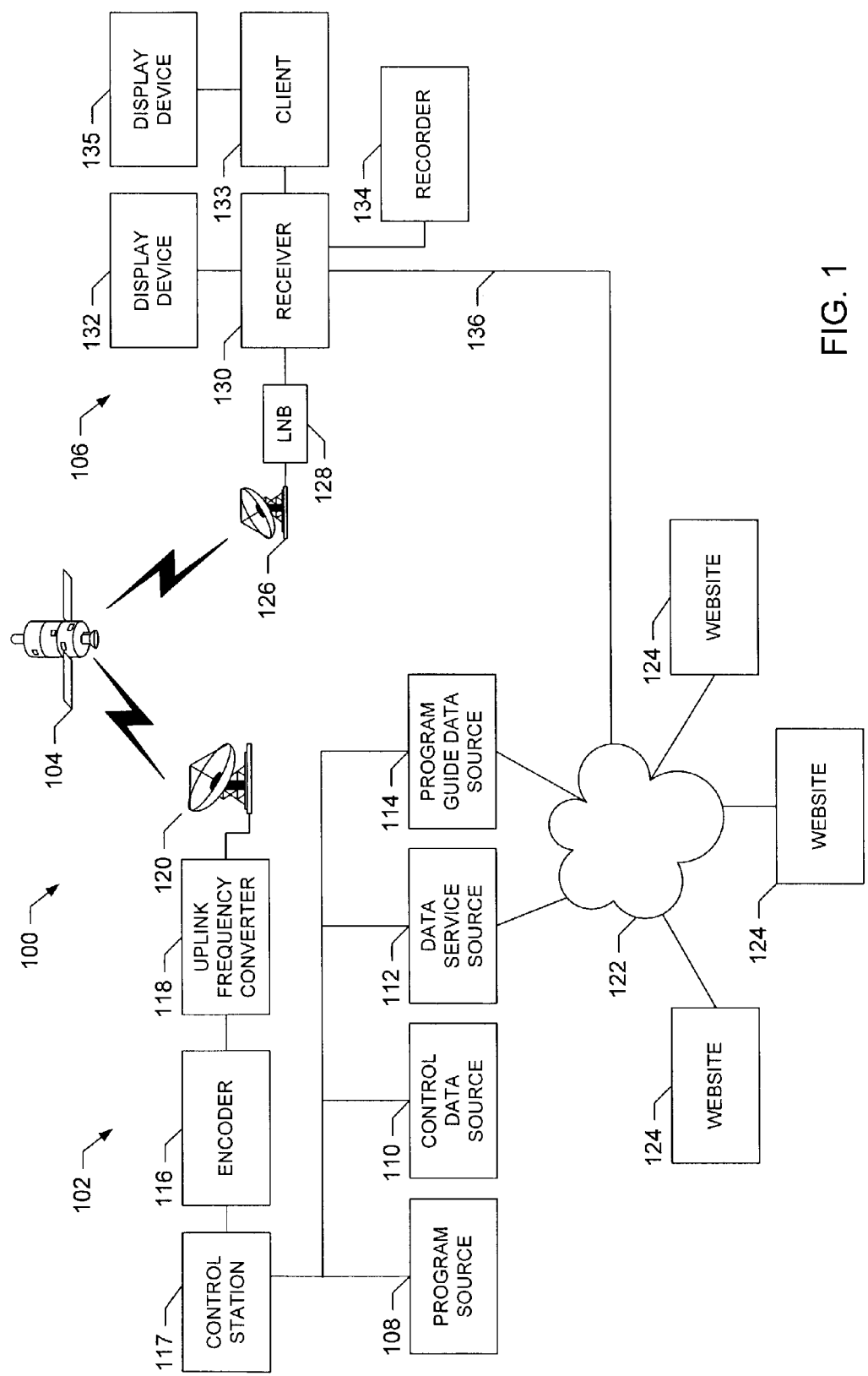
FIG. 1 is an example direct-to-home satellite system.

As shown in FIG. 1, an example direct-to-home (DTH) satellite system 100 generally includes a transmission station 102, a satellite/relay 104 and a plurality of receiver stations, one of which is shown at reference numeral 106, between which wireless communications are exchanged. The wireless communications may take place at any suitable frequency, such as, for example, Ku-band frequencies. As described in detail below with respect to each portion of the system 100, information from the transmission station 102 is transmitted to the satellite/relay 104, which may be at least one geosynchronous or geo-stationary satellite that, in turn, rebroadcasts the information over broad geographical areas on the earth that include receiver stations 106. To facilitate backchannel communications, the receiver stations 106 may be communicatively coupled to the transmission station 102 via a terrestrial communication link, such as a telephone line and/or an Internet connection.

In further detail, the example transmission station 102 of FIG. 1 includes a program sources 108, a control data source 110, a data service source 112, one or more program guide data sources 114. During operation, information from one or more of these sources 108-114 passes to an encoder 116 via a control station 117. The control station 117 comprise one or more programmable computers structured to control the overall operation of the transmission station 102. The encoder 116 encodes the information for broadcast to the satellite/relay 104. Encoding includes, for example, converting the information into data streams that are multiplexed into a packetized data stream or bitstream using a number of conventional algorithms. A header is attached to each data packet within the packetized data stream to facilitate identification of the contents of the data packet. The header also includes a service channel identifier (SCID) that identifies the data packet. This data packet is then encrypted. As will be readily appreciated by those having ordinary skill in the art, a SCID is one particular example of a program identifier (PID).

To facilitate the broadcast of information, the encoded information passes from the encoder 116 to an uplink frequency converter 118 that modulates a carrier wave and passes the modulated carrier wave to an uplink antenna 120, which broadcasts the information to the satellite/relay 104.

In a conventional manner, the encoded bitstream is modulated and sent through the uplink frequency converter 118, which converts the modulated encoded bitstream to a frequency band suitable for reception by the satellite/relay 104. The modulated, encoded bitstream is then routed from the uplink frequency converter 118 to the uplink antenna 120 where it is broadcast toward the satellite/relay 104.

The programming sources 108 receive video and audio programming from a number of sources, including satellites, terrestrial fiber optics, cable, or tape. The video and audio programming may include, but is not limited to, television programming, movies, sporting events, news, music or any other desirable content.

Like the programming sources 108, the control data source 110 passes control data to the encoder 116. Control data may include data representative of a list of SCIDs to be used during the encoding process, or any other suitable information.

The data service source 112 receives data service information and web pages made up of text files, graphics, audio, video, software, etc. Such information may be provided via a network 122. In practice, the network 122 may be the Internet, a local area network (LAN), a wide area network (WAN) or a conventional public switched telephone network (PSTN). The information received from various sources is compiled by the data service source 112 and provided to the encoder 116. For example, the data service source 112 may request and receive information from one or more websites 124. The information from the websites 124 may be related to the program information provided to the encoder 116 by the program source 108, thereby providing additional data related to programming content that may be displayed to a user at the receiver station 106.

The program guide data source 114 compiles information related to the SCIDs used by the encoder 116 to encode the data that is broadcast. For example, the program guide data source 114 includes information that the receiver stations 106 use to generate and display a program guide to a user, wherein the program guide may be a grid guide that informs the user of particular programs that are available on particular channels at particular times. The program guide also includes information that the receiver stations 106 use to assemble programming for display to the user. For example, if the user desires to watch a baseball game on his or her receiver station 106, the user will tune to a channel on which the game is offered. As described in detail below, the receiver station 106 gathers the SCIDs related to the game, wherein the program guide data source 114 has previously provided to the receiver station 106 a list of SCIDs that correspond to the game.

The satellite/relay 104 receives the modulated, encoded Ku-band bitstream and re-broadcasts it downward toward an area on earth that includes the receiver station 106. As shown in FIG. 1, the example receiver station 106 includes a reception antenna 126 connected to a low-noise-block (LNB) 128 that is further connected to a receiver 130. As described in conjunction with FIGS. 2 and 3 below, the receiver 130 may be a set-top box or may be a personal computer (PC) having a receiver board installed therein. A display device 132, such as, for example, a television set or a computer monitor, is coupled to the receiver 130 for displaying received programming to a user. Additionally, the example receiver station 106 may include a recorder 134 used to record programming received by the receiver station 106. The recorder 134 may be, for example, a device capable of recording information on media, such as videotape or digital media such as a hard disk drive, a digital versatile disk (DVD), a compact disk (CD) and/or any other suitable media.

In addition, the example receiver station 106 includes one or more client devices 133. As described in detail below, a client device 133 is a device that is capable of generating audio/video signals like a receiver 130. One or more client devices 133 may be distributed throughout a household and may receive encrypted content from a host receiver 130. Accordingly, the client device 133 is attached to another display device 135 for displaying received programming to a user. However, a client device 133 is not attached directly to a satellite feed. Therefore, the client device 133 need not include a tuner, a conditional access smartcard, and/or other components of a traditional receiver 130. Similarly, the client device 133 need not include a hard disk drive or other large non-volatile memory for storing digital content.

Although not necessary for proper operation of the disclosed system, the receiver station 106 may optionally incorporate a connection 136 (e.g., Ethernet circuit or modem) to the network 122 for transmitting requests and other data back to the transmission station 102 (or a device managing the transmission station 102 and overall flow of data in the system 100) and for communicating with websites 124 to obtain information therefrom.

In operation of the receiver station, the reception antenna 126 receives signals including a bitstream from the satellite 104. The signals are coupled from the reception antenna 126 to the LNB 128, which amplifies and, optionally, downconverts the received signals. The LNB output is then provided to the receiver 130, which, as described in detail below, receives, depacketizes, demultiplexes and decodes the received signal to provide audio and video signals to the display device 132 and/or the recorder 134. The receiver 130 is responsive to user inputs to tune to a particular program, by selecting and decoding a particular frequency and the particular SCIDs on which the desired program is located.

Figure 2:
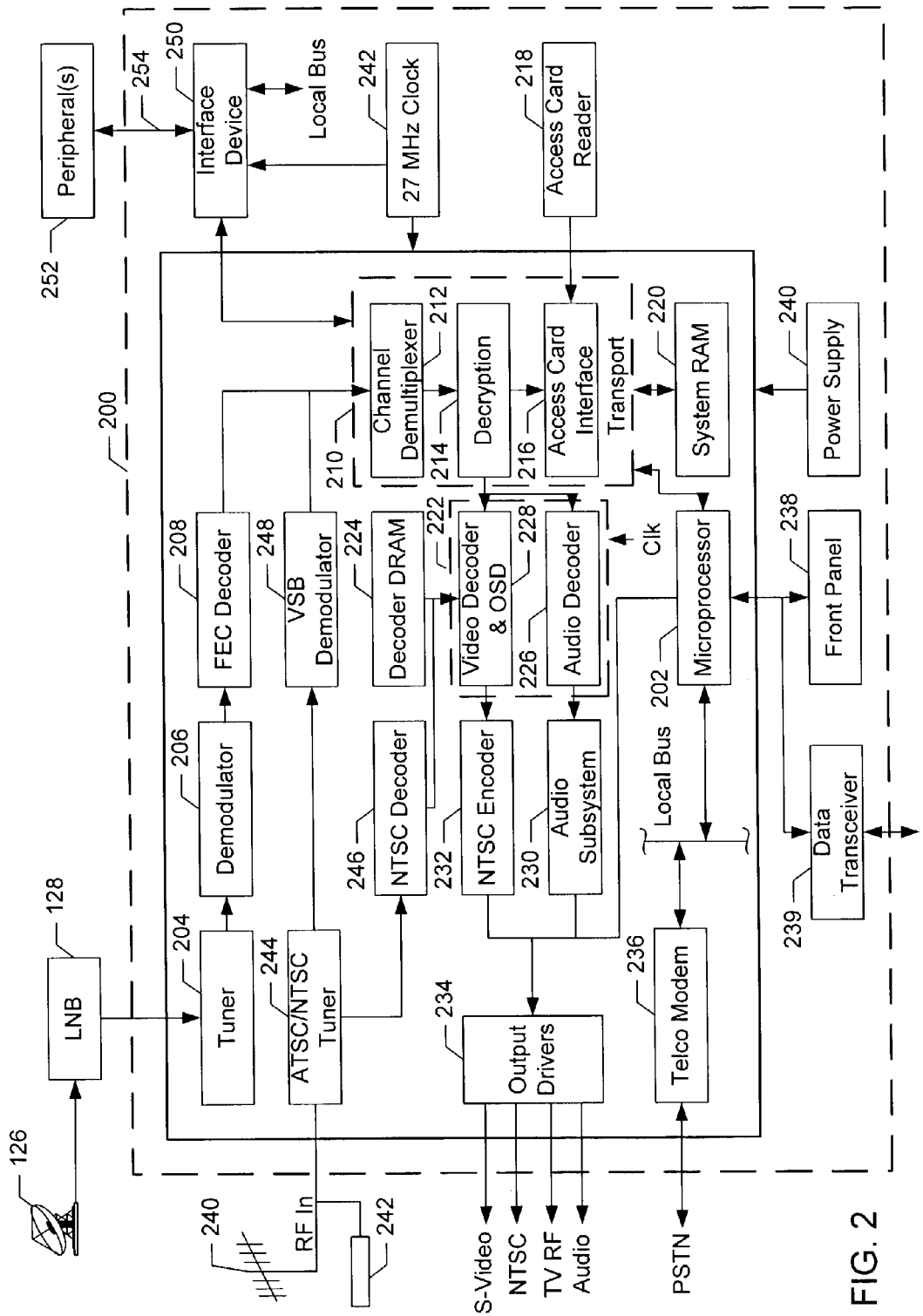
FIG. 2 is an example of the receiver of FIG. 1.

FIG. 2 is a detailed illustration of a first example receiver 200, it being understood that the receiver 200 may be used as the receiver 130 of FIG. 1. In general, front-end circuitry inside the receiver 200 receives the L-band RF signals from the LNB 128 and converts the signals back into the original digital data stream. Decoding circuitry receives the original data stream and performs video/audio-processing operations such as demultiplexing and decompression. A microprocessor or central processing unit (CPU) 202 controls the overall operation of the receiver unit 200, including the selection of parameters, the set-up and control of components, channel selection, and many other functions.

Specifically, the receiver unit 200 includes a tuner 204, a demodulator 206, a forward error correction (FEC) decoder 208, a transport circuit 210, a channel demultiplexer 212, a decryption circuit 214, an access card interface 216, an access card reader 218, a memory device 220, an audio/video decoder circuit 222 having a random access memory (RAM) 224, an audio decoder 226, a video decoder 228, an audio subsystem 230, an NTSC (or other) encoder 232, output drivers 234, a modem connection 236, a front panel user interface 238, a data transceiver 239, and a power supply 240, coupled together as illustrated. As further shown in FIG. 2, a 27 megahertz (MHz) clock signal generator 242 is also provided. The clock generator 242 generates a clock signal (CK) that is coupled to the audio/video decoder circuit 232 and that is frequency-calibrated by a signal received from the transport circuit 210, as shown. The data transceiver 239 is used to communicate digital data with other devices and may be any type of data transceiver such as an Ethernet transceiver.

The transport 210 receives the transport stream of digitized data packets containing video, audio, data, scheduling information, and other data. The digital packet information contains identifying headers as part of its overhead data. Under control of the microprocessor 202, the channel demultiplexer 212 filters out packets that are not currently of interest, and routes the data packets that are of interest through the decryption circuit 214 and, in the case of some packets, also through the access control circuits 216, 218 to their proper downstream destination. The decryption circuit 214 provides decryption for the data packets that have been encrypted. The access control circuits 216, 218 provide access control by any conventional means. For example, access control may be achieved by requiring a data packet to have a proper authorization code in order to be passed to the decryptor 214 and/or video decoder 228. The access card reader 218 can interface with an access card (not shown) that receives the packet authorization code, determines its validity, and generates a code that confirms to the transport 210 that the subject data packet is authorized.

The authorized data of interest, which now consists of the payload portions of the received data packets, are forwarded to decoder dynamic random access memory (DRAM) 224 for buffering and may optionally be intermediately stored in the memory device 220. The audio/video decoder 222 decodes the payloads stored in DRAM 224, as needed. The requested data is routed from the memory device 220 through the transport 210 to the audio/video decoder 222. At that time, the data is routed to the video decoder 228 (which includes display generating circuitry) and the NTSC (or other) encoder 232. The video decoder 228 reads in the compressed video data from the DRAM 224, parses it, creates quantized frequency domain coefficients, then performs an inverse quantization, inverse discrete cosine transform (DCT) and motion compensation. At this point, an image is reconstructed in the spatial domain. This image is then stored in a frame buffer in the DRAM 224. At a later time, the image is read out of the frame buffer in DRAM 224 and passed through the display circuitry to the encoder 232. The display circuitry (located in the video decoder 228) generates graphics that allow an electronic program guide to be displayed. The encoder 228 may convert the digital video signals to, for example, an analog signal according to the NTSC standard or to another desired output protocol (e.g., ATSC), thereby allowing video to be received by the display device 132.

As shown in FIG. 2, an antenna 240 and/or a cable line 242 may be coupled to the receiver 200 to provide information content from cable or terrestrial broadcast systems (not shown). The signals from the antenna 240 and/or the cable line 242 are coupled to both the output drivers 234 and an ATSC/NTSC tuner 244. The output of the tuner 244 is coupled to an NTSC decoder 246 and to a vestigial side band (VSB) demodulator 248. The output from the decoder 246 is coupled to the decoder 222 and the output of the demodulator 248 is coupled to the transport 210. Additionally, the receiver 200 may include an interface device 250 that receives the clock signal and that is coupled to the local bus of the microprocessor 202. The interface device 250 may be used to provide connectivity to one or more peripherals 252 via a bus 254.

Figure 3:
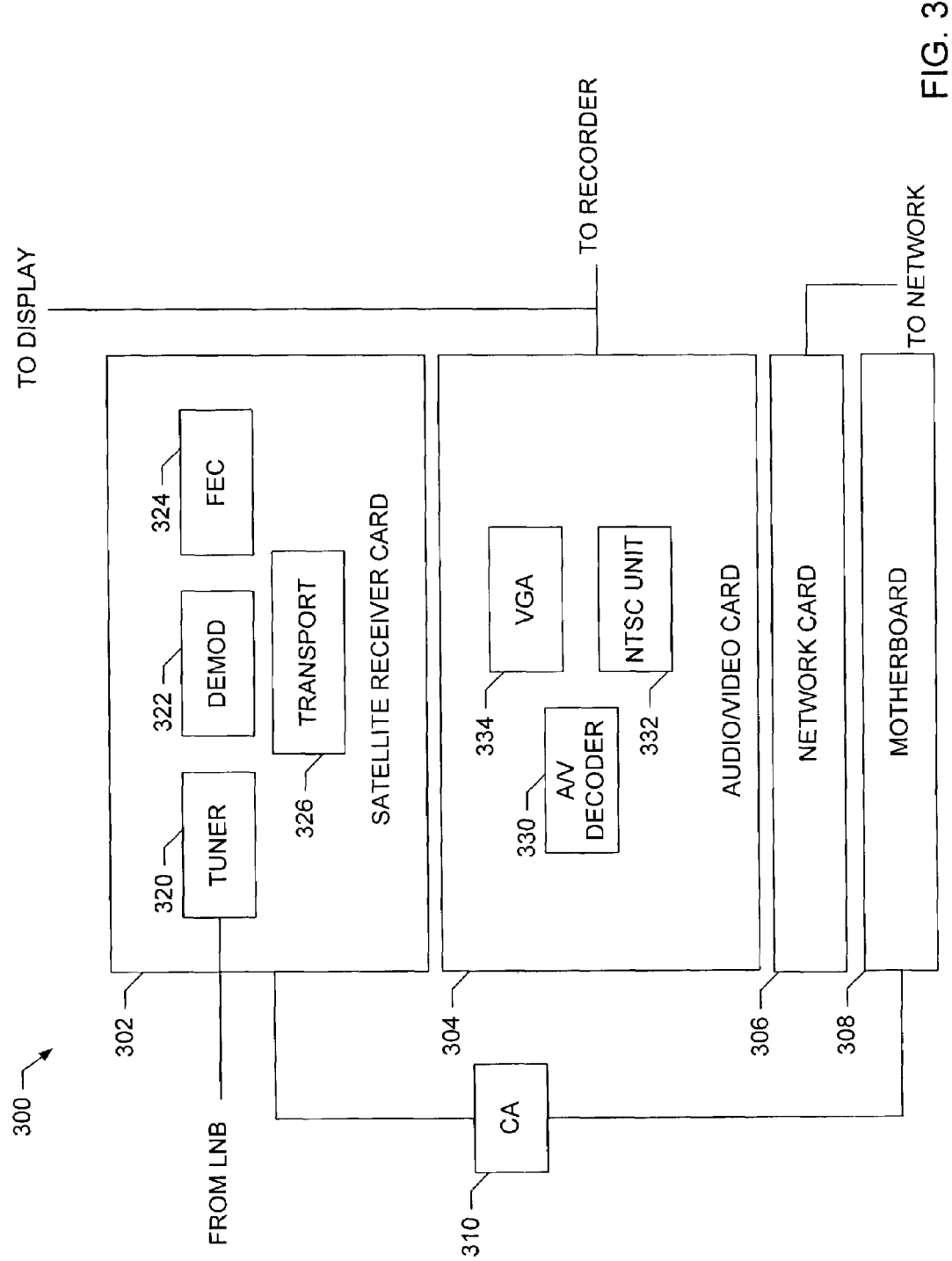
FIG. 3 is another example of the receiver of FIG. 1.

FIG. 3 is a detailed illustration of a second example receiver 300 having a PC architecture, it being understood that the receiver 300 could be used as the receiver station 130 of FIG. 1. As shown, the receiver 300, which receives an input from the LNB 128, includes a satellite receiver board 302, an audio/video board 304 and a network board 306, each of which may be coupled to a motherboard 308. The video/audio decoder board 320 could, of course, be integrated with the satellite receiver board 302. The receiver station 300 also includes a conditional access module 310 and a mass memory such as a hard disk (not shown).

In one example, the satellite receiver board 302 includes a tuner 320, a demodulator 322, a forward error correction (FEC) decoder 324 and a transport functional processing block 326. The interconnection of these devices is substantially the same as shown and described in conjunction with FIG. 3.

The audio/video decoder board 304 includes an audio/video decoder 330, an optional NTSC and/or ATSC output driver 332 and a VGA output driver 334. As described below in detail, the satellite receiver board 302 and the audio/video board 304 receive and decode the signal received from the LNB 126.

In operation, an incoming signal from the LNB 128 is received by the satellite receiver board 302 and passed through a series of initial processing operations including the tuner 320, the demodulator 322 and the forward error correction decoder 324, before passing to the transport functional processing block 326. Although the functional circuits within the transport functional processing block 326 are not illustrated, they are identical to the channel demultiplexing, decryption, and access determination circuit blocks of a standard transport decoder, as described in conjunction with FIG. 2. For example, the transport functional processing block 326 receives the transport stream or bitstream of digitized data packets containing video, audio, scheduling information, and other data. The digital packet information contains identifying headers as part of its overhead data. Under control of a main processor/controller (typically located on the motherboard 308), the transport functional processing block 326 filters out received data packets that are not currently of interest. Received data packets that are of interest are routed through decryption and access control operations within the conditional access module 310. Access control may be provided by any known means, such as, for example, by requiring a data packet to have a proper authorization code in order to be passed to the audio/video decoder board 304.

The transport functional processing block 326 passes the data to the audio/video decoder 330 of the video/audio decoder board 304. The authorized data of interest are stored in system random access memory (RAM) (not shown) for buffering, and the video/audio decoder 330 retrieves the data from RAM as needed.

For video data, the audio/video decoder 330 reads in the compressed video data from its RAM, parses it, creates quantized frequency domain coefficients, then performs an inverse quantization, inverse discrete cosine transform (DCT) and motion compensation. At this point, an image has been reconstructed in the spatial domain. This image is then stored in a frame buffer in the video decoder's RAM. At a later time, the image is read out of the frame buffer and passed through the display circuitry to the VGA output driver 334 and optionally, to the NTSC and/or ATSC output driver 332, the output of which is coupled to the display device 132 and/or the recorder 134. The display circuitry also generates graphics and text for a graphical user interface (GUI), such as an electronic program guide, to be displayed.

The allocation of memory and control functions may be arbitrarily divided between the boards 302-308 of the system 300. Thus, a substantial amount, or possibly all, of the control and memory functions for operation of the disclosed system may be integrated within a single board, or alternatively, may be incorporated within the PC motherboard 308.

Figure 4:
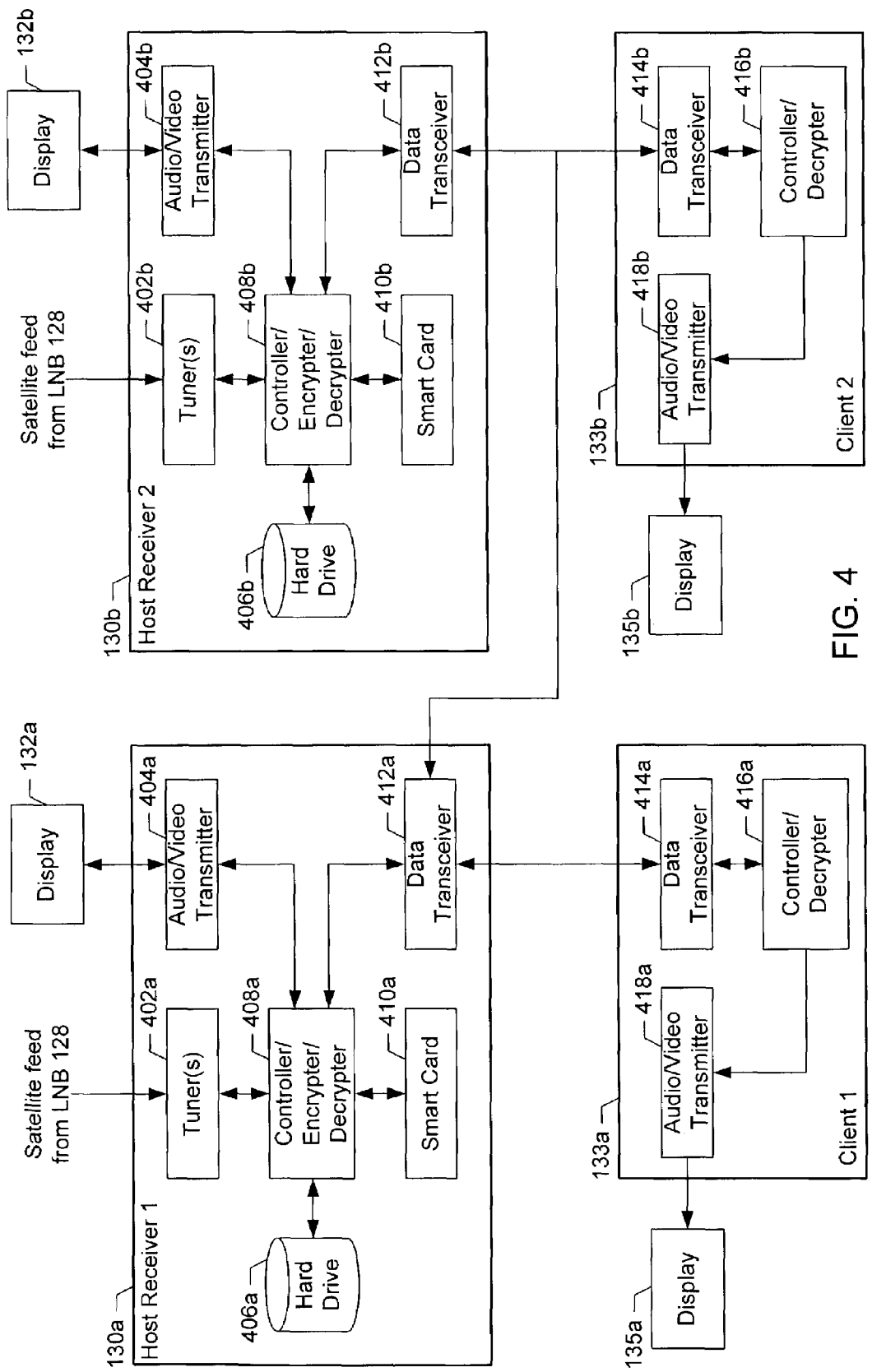
FIG. 4 is a block diagram of an example client/host system.

Typically, one or more receivers 130 and/or client devices 133 are located within a household. An example client/host system showing two receivers 130 (i.e., 130a and 130b) and two client devices 133 (i.e., 133a and 133b) is illustrated in FIG. 4. Each receiver 130 may be the receiver 200 illustrated in FIG. 2. However, for simplicity in explanation, certain components have been omitted and/or combined. In this example, each receiver 130 includes one or more tuners 402, an audio/video transmitter 404, a hard disk drive (or other memory device) 406, a controller 408, a smart card 410, and a data transceiver 412. Like the receivers 130, each client 133 also includes a data transceiver 414, a controller 416, and an audio/video transmitter 418. However, the client devices 133 do not necessarily include a tuner, a hard disk drive, and/or a smart card.

Each receiver controller 408 operatively couples the other receiver components (e.g., components 402-406, 410, and 412) together as shown and manages the overall operation of the receiver 130. In this example, the controller 408 also includes encryption/decryption circuits, and/or the controller 408 executes encryption/decryption software. Of course, the encryption and decryption functions may be performed outside the controller 408. For example, a separate integrated circuit (IC) may be used to encrypt and/or decrypt digital data.

Similarly, each client controller 416 operatively couples the other client components (e.g., components 414 and 418) together as shown and manages the overall operation of the client 133. In this example, the controller 416 also includes a decryption circuit, and/or the controller 416 executes decryption software. Of course, the decryption function may be performed outside the controller 416 (e.g., by a separate IC).

In this example, each receiver 130 acquires digital content (e.g., an encrypted movie, sporting event, etc.) from the LNB 128 by causing the tuner 402 to tune to a predetermined frequency and decoding the received bitstream. Next, the receiver 130 determines if it is authorized to access the digital content based on the smart card 410 inserted in the receiver 130. If the receiver 130 is authorized, the digital content is then decrypted and transmitted to the display 132 via the audio/video transmitter 404. In addition, the digital content may be stored on the hard drive 406 for viewing at a later time.

A client device 133 (or another receiver 130) may receive digital content from a receiver 130 as the digital content is being acquired from the LNB 128 and/or from a receiver 130 to a client device 133 (or another receiver 130) is encrypted by the receiver 130 and transmitted from one data transmitter 412 to another data transmitter 412, 414 as described in detail below. Once a client data transceiver 414 receives the encrypted digital content, the controller/decrypter 416 attempts to decrypt the digital content and pass the decrypted digital content on to the client's audio/video transmitter 418. If the client 133 is able to decrypt the content, the digital content is transmitted to the client display 135 via the audio/video transmitter 418.

Figure 5:
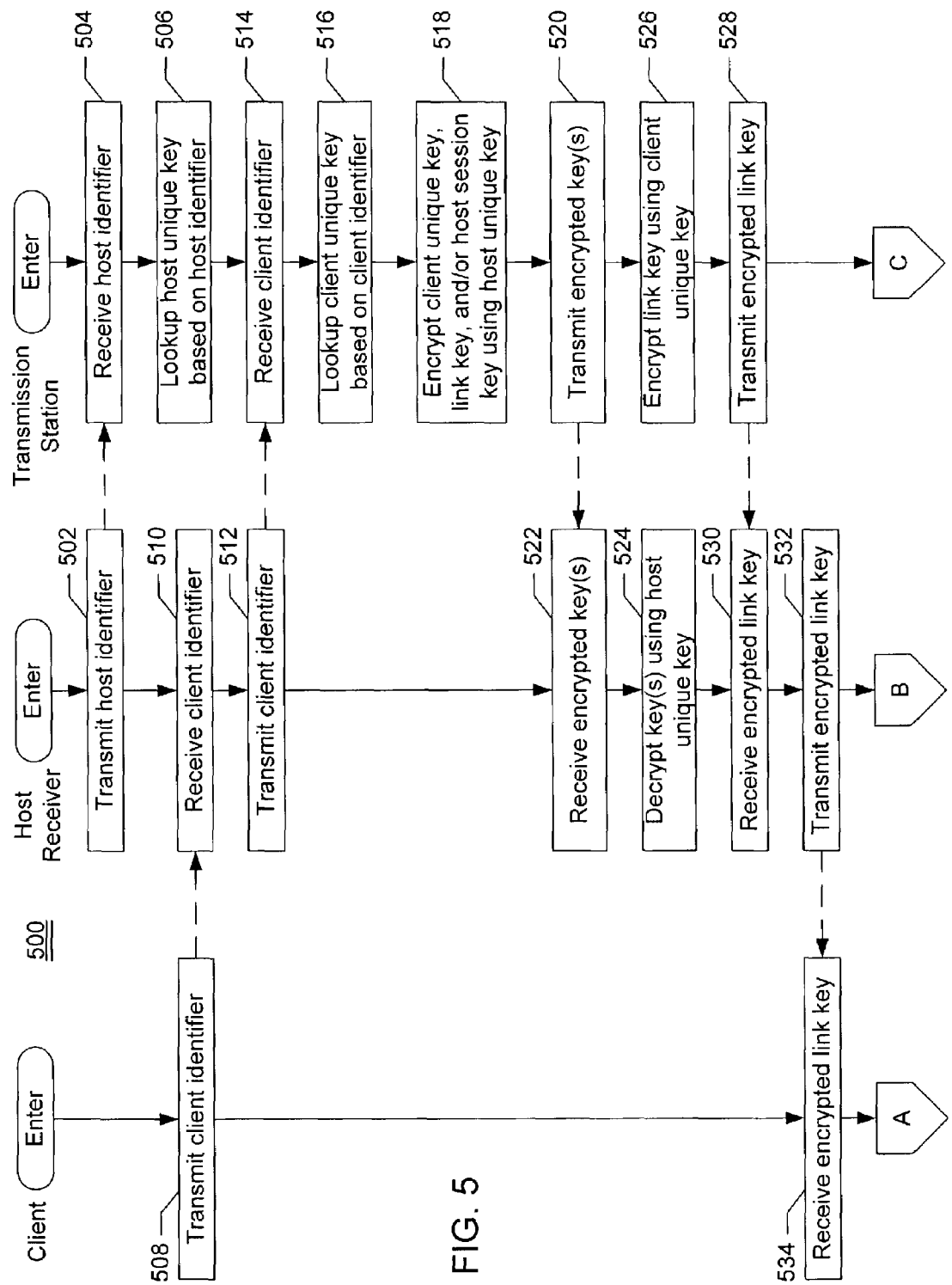
FIGS. 5-6 are a flowchart illustrating an example method of distributing digital content from a satellite to a client device via a host receiver.
Figure 6:
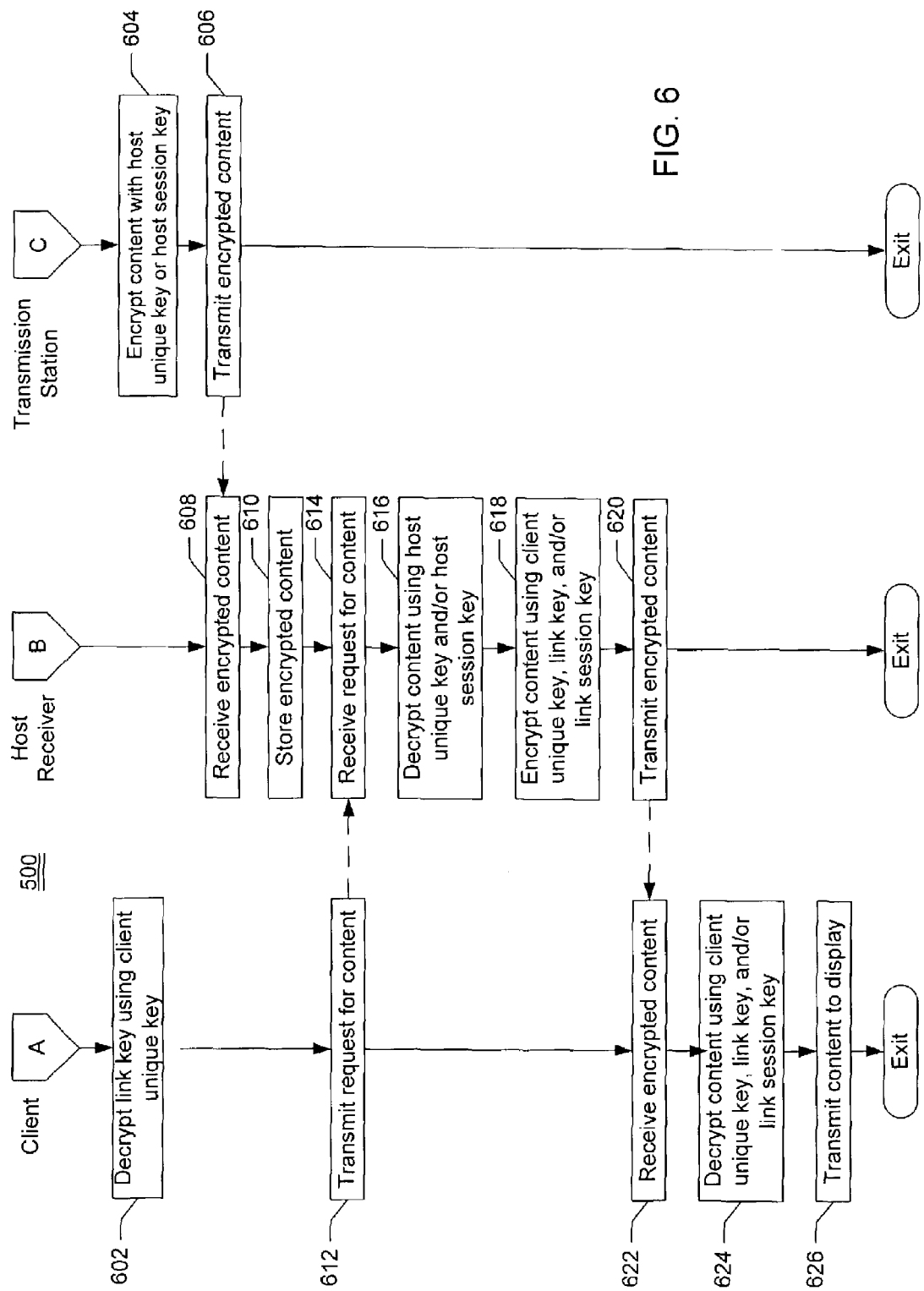

An example process 500 for distributing digital content from a satellite to a client device via a host receiver is illustrated in FIGS. 5-6. Preferably, the process 500 is embodied in one or more software programs which are stored in one or more memories and executed by one or more processors in a well known manner. However, some or all of the blocks of the process 500 may be performed manually. Although the process 500 is described with reference to the flowchart illustrated in FIG. 5, a person of ordinary skill in the art will readily appreciate that many other methods of performing the process 500 may be used. For example, the order of many of the blocks may be altered, the operation of one or more blocks may be changed, blocks may be combined, and/or blocks may be eliminated.

In general, the example process 500 includes transmission of a host identifier and a client identifier from a host receiver 130 and a client device 133 to a satellite transmission station 102. The identifiers are used by the transmission station 102 to lookup unique encryption keys associated with the host receiver 130 and client device 133. The transmission station 102 then transmits one or more encrypted keys to the host receiver 130 and/or client 133. In addition, the transmission station 102 transmits encrypted content to the host receiver 130. In turn, the host receiver 130 decrypts the content using one encryption key, re-encrypts the content using another encryption key, and passes the content along to the client device 133.

The example process 500 begins when a host receiver 130 transmits a unique identifier to the transmission station 102 (block 502). Typically, this unique host identifier is stored in the host receiver 130 when the host receiver 130 is manufactured. In one example, the host receiver 130 transmits the host identifier to the transmission station 102 via the connection 136. However, any medium may be used to transmit the host identifier to the transmission station 102. For example, an Internet connection may be used. Alternatively, during a setup procedure, a customer may read the host identifier to an operator or enter the host identifier into a touch-tone recognition system.

Once the host identifier is received by the transmission station 102 (block 504), the transmission station 102 looks up one or more encryption keys associated with the host receiver 130 based on the host identifier (block 506). The encryption key may be any type of encryption key such as a symmetric encryption key, a public encryption key, and/or a private encryption key. The encryption key may be permanently assigned to the host receiver 130, or the encryption key may be temporary.

Preferably, a different unique identifier is assigned to the client device 133. Accordingly, the client device 133 transmits its unique identifier to the host receiver 130 (block 508). The client device 133 may transmit its unique identifier to the host receiver 130 via the data transceiver 414, which may be any type of data transceiver such as an Ethernet transceiver. Once the host receiver 130 receives the client's unique identifier (block 510), the host receiver 130 transmits the client's unique identifier to the to the transmission station 102 (block 512). Again, the host receiver 130 may transmit data to the transmission station 102 via the connection 136, an Internet connection, an operator, a touch-tone recognition system, etc.

Once the unique client identifier is received by the transmission station 102 (block 514), the transmission station 102 looks up one or more encryption keys associated with the client 133 based on the unique client identifier (block 516). Again, the encryption key may be any type of encryption key such as a symmetric encryption key, a public encryption key, and/or a private encryption key. The encryption key may be permanently assigned to the client 133, or the encryption key may be temporary.

In order for the host receiver 130 to encrypt digital content for the client device 133, the host receiver 130 must know the client's unique encryption key, a link key associated with the client device 133, and/or a session key associated with the client device 133. Preferably, the client's unique encryption key is stored in the client device 133 at a factory when the client device 133 is manufactured. A client key can be used to transfer any amount of digital content to the associated client device 133 by any other device that knows the client key. A link key is an encryption key that is only known by a small number of devices (e.g., one host receiver 130 and one client device 133). A link key may be used repeatedly by the associated devices for a plurality of digital content transfers. For example, a link key may be established when a client device 133 is initially installed in a home or each time the client device 133 is turned on. Subsequently, the link key may be used to transfer any number of movies, television programs, etc. from an associated host receiver 130 to the client device 133. A session key is an encryption key that can only be used to transfer one specific piece of digital content. For example, a session key may be based on a content identifier and a link key. As a result, that session key may only be used to transfer the digital content associated with the content identifier between devices that know the link key.

Regardless of what type of key(s) are used, the transmission station 102 encrypts the key(s) (e.g., client, link, and/or session keys) using the host receiver's unique key (block 518). The transmission station 102 then transmits the encrypted client key(s) to the host receiver 130 (block 520).

Once the host receiver 130 receives the encrypted key(s) (block 522), the host receiver 130 decrypts the key(s) using the host's key (block 524). If the host receiver 130 receives the client's unique key, the host receiver 130 may use the client's key to communicate securely with the client device 133. However, if the host receiver 130 receives a link key (and is unaware of the client's unique key for security reasons), the transmission station 102 also encrypts the link key using the client's unique key (block 526). The transmission station 102 then transmits the encrypted link key to the host receiver 130 (block 528). Subsequently, the host receiver 130 receives (block 530) and retransmits (block 532) the encrypted link key to the client device 133.

Once the client device 133 receives the link key (block 534), the client device 133 decrypts the link key using the client's key (block 602 of FIG. 6). Of course, if a link key is not used (e.g., the host receiver 130 is allowed to know the client key), the client 133 need not receive or decrypt a link key.

At any time after an initial setup of the host receiver 130, the transmission station 102 may encrypt digital content for the host receiver 130 using the host's unique encryption key or a host session key (block 604). The encrypted content is then transmitted to the host receiver 130 via the satellite/relay 104 (block 606). Once the host receiver 130 receives the encrypted content (block 608), the host receiver 130 stores the encrypted content locally (block 610). The content may be stored on any machine readable medium such as a magnetic disk drive, an optical disk drive, solid state memory, etc. Preferably, the content is stored in the encrypted state. However, the content may be decrypted using the host's unique key or a session key prior to storage.

Subsequently, the client device 133 may request a copy of the digital content from the host receiver 130 (block 612). For example, a user of the client device 133 may select the content from an on-screen menu representing content stored on the host receiver 130. When the host receiver 130 receives the content request from the client device 133 (block 614), the host receiver 130 decrypts the requested content using its own unique key or a session key (block 616). The decrypted content is then re-encrypted using a key associated with the client device 133 (block 618). The key associated with the client device 133 may be the client's unique key, a link key, or a session key.

Figure 8:
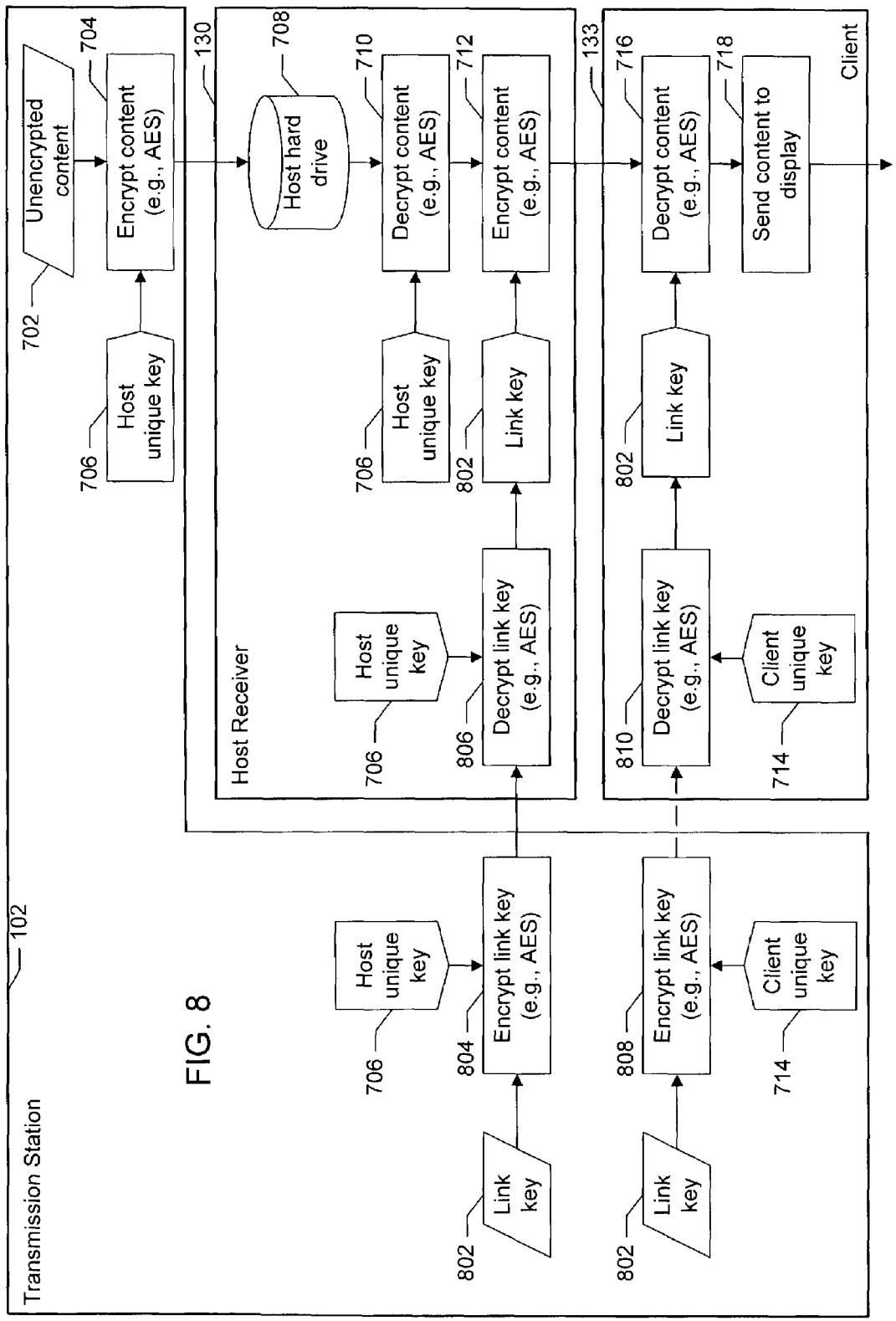
FIG. 8 is a block diagram of an example system using a link key to re-encrypt content.
Figure 9:
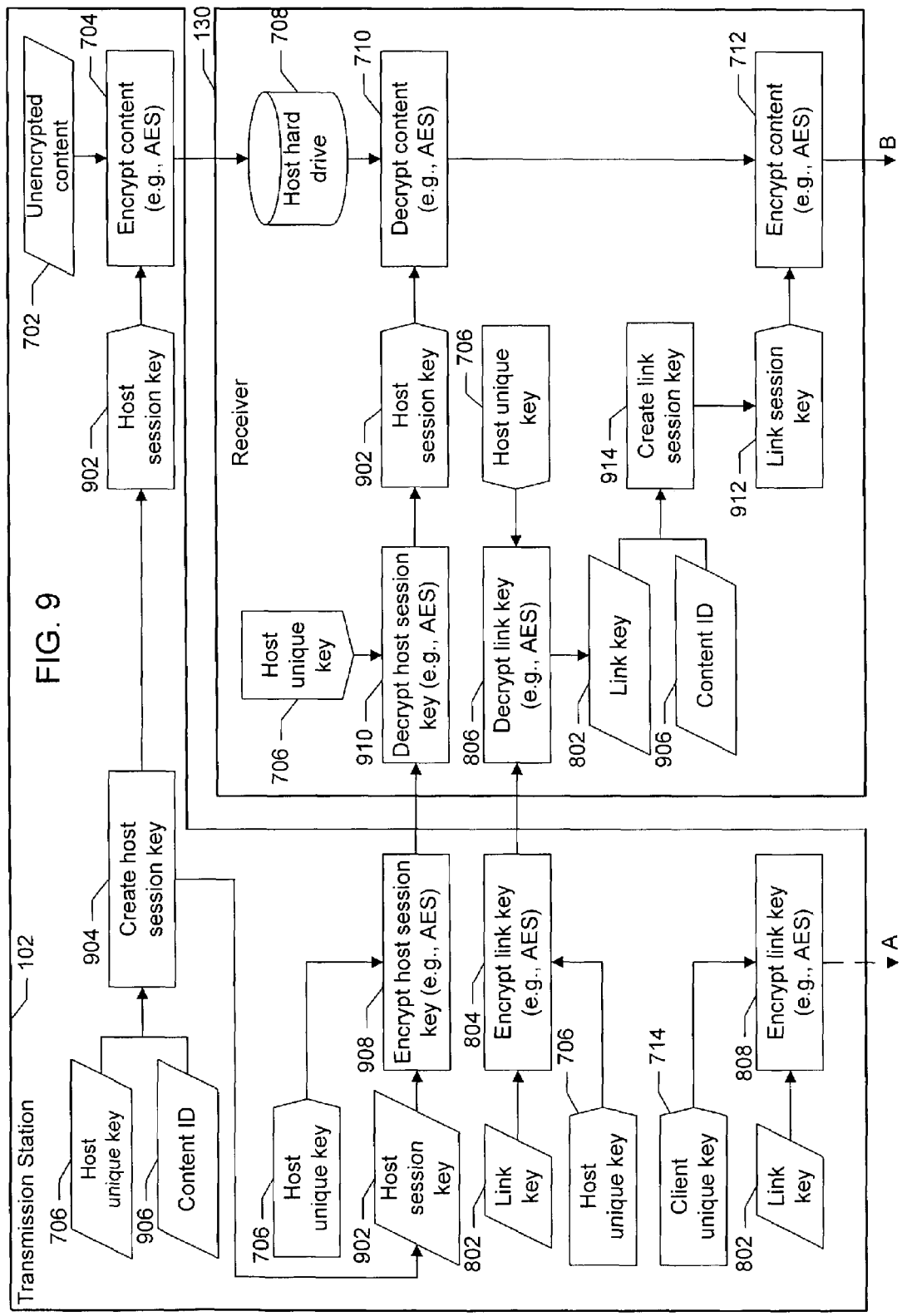
FIGS. 9-10 are a block diagram of an example system using a session key to re-encrypt content.

Once the requested content is re-encrypted using a key associated with the client device 133, the host receiver 130 transmits the content to the client device 133 (block 620). The client device 133 receives the encrypted content (block 622), decrypts the content using the appropriate key (block 624), and transmits a signal indicative of the decrypted content to the display device 132 (block 626). As discussed above, the key used by the host receiver 130 to re-encrypt the content for decryption by the client device 133 may be the client's unique key, a link key, or a session key. An example use of each of these key types is illustrated in FIGS. 7-9.

Figure 7:
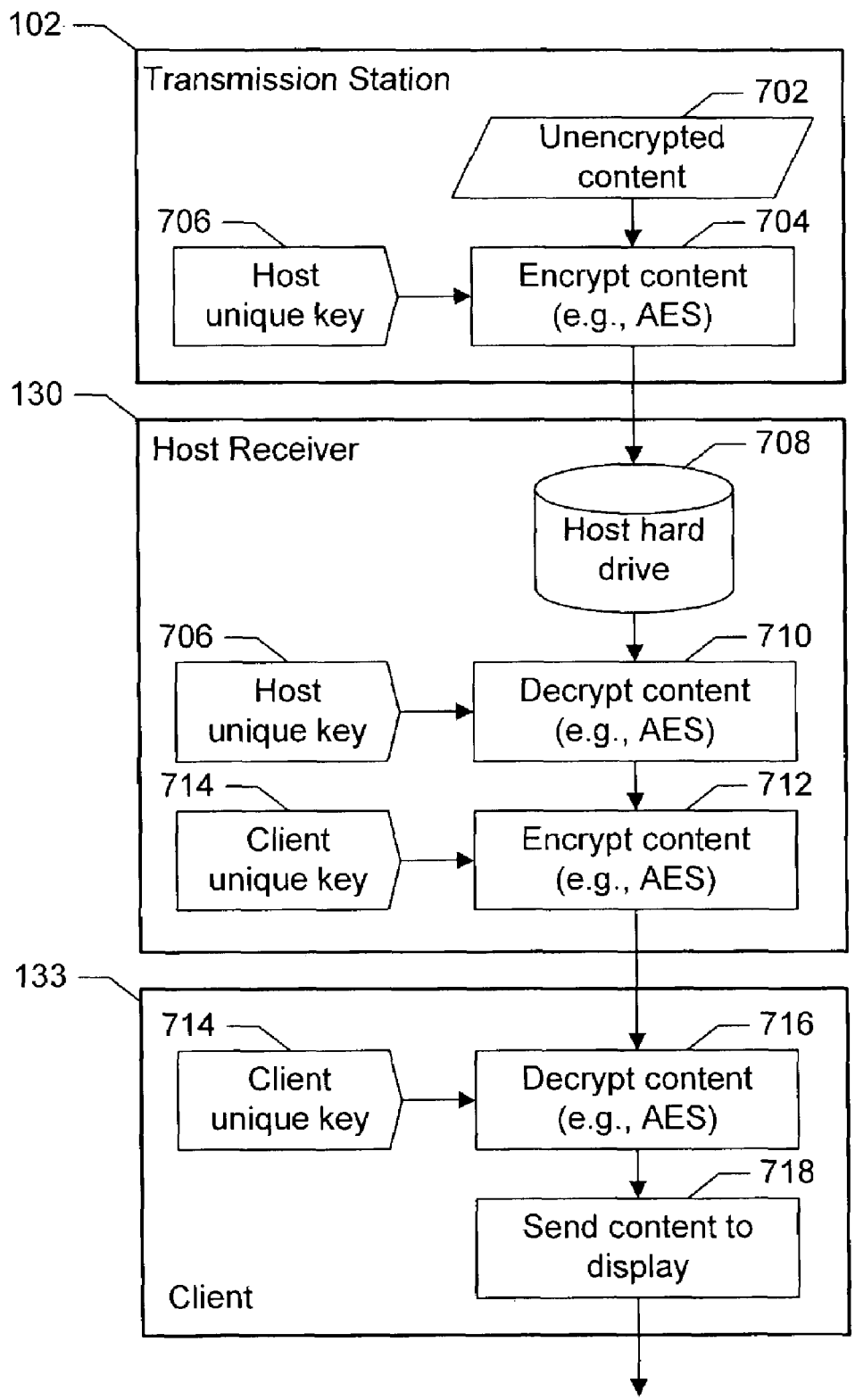
FIG. 7 is a block diagram of an example system using a unique client key to re-encrypt content.

A block diagram of an example system using the client's unique key to re-encrypt content is illustrated in FIG. 7. In this example, the transmission station 102 encrypts unencrypted content 702 by executing an encryption algorithm 704 on the unencrypted content 702. The encryption algorithm 704 may be any encryption algorithm such as the well known Data Encryption Standard (DES), Triple Data Encryption Standard (3 DES) or Advanced Encryption Standard (AES). At this stage, the encryption algorithm 704 uses the host's unique key 706 to encrypt the content. The encrypted content is then transmitted to the host receiver 130 and stored on a hard-drive 708 (or any other memory device).

Subsequently, when the content needs to be sent to a client device 133, the host receiver 130 executes a decryption algorithm 710 on the encrypted content using the host unique key 706. Although the same key is used to encrypt and decrypt the content in this example, a person of ordinary skill in the art will readily appreciate that an asymmetric pair of encryption keys could also be used to encrypt and decrypt the digital content.

In this example, the host receiver 130 then re-encrypts the content by executing an encryption algorithm 712 on the unencrypted content using the client unique key 714. This encryption algorithm 712 may be the same as the encryption algorithm 704 used by the transmission station 102, or the encryption algorithm 712 used by the host receiver 130 may be different than the encryption algorithm 704 used by the transmission station 102. The encrypted content is then transmitted to the client device 133.

Once the content is received by the client device 133, the client device 133 executes a decryption algorithm 716 on the encrypted content using the client unique key 714. Again, the same key is used to encrypt and decrypt the content in this example. However, an asymmetric pair of encryption keys could also be used to encrypt and decrypt the content. Once the content is received and decrypted by the client device 133, the client device 133 may send 718 the content to a display 132, such as a television.

A block diagram of an example system using a link key to re-encrypt content is illustrated in FIG. 8. Like the previous example, the transmission station 102 encrypts unencrypted content 702 by executing an encryption algorithm 704 on the unencrypted content 702. The encryption algorithm 704 may be any encryption algorithm such as the well known Triple Data Encryption Standard (3 DES). Again, the encryption algorithm 704 uses the host's unique key 706 to encrypt the content. The encrypted content is then transmitted to the host receiver 130 and stored on the hard-drive 708 (or any other memory device).

Subsequently, when the content needs to be sent to the client device 133, the host receiver 130 executes a decryption algorithm 710 on the encrypted content using the host unique key 706. Although the same key is used to encrypt and decrypt the content in this example, a person of ordinary skill in the art will readily appreciate that an asymmetric pair of encryption keys could also be used to encrypt and decrypt the digital content.

Unlike the previous example, the host receiver 130 then re-encrypts the content by executing an encryption algorithm 712 on the unencrypted content using a link key 802. The host receiver 130 receives the link key 802 from the transmission station 102. More specifically, the transmission station 102 executes an encryption algorithm 804 on the link key 802. The encryption algorithm 804 uses the host unique key 706 to encrypt the link key 802. The encrypted link key is then transmitted to the host receiver 130. Once the encrypted link key is received by the host receiver 130, the host receiver 130 executes a decryption algorithm 806 on the encrypted link key using the host unique key 706. The unencrypted link key 802 may then be used by the host receiver 130 to re-encrypt the digital content 712.

The encrypted content is then sent to the client device 133, and the client device 133 executes a decryption algorithm 716 on the encrypted content using the link key 802. Of course, an asymmetric pair of encryption keys could also be used to encrypt and decrypt the content. Like the host receiver 130, the client device 133 receives the link key 802 from the transmission station 102. However, the client device 133 receives the link key 802 indirectly via the host receiver 130. More specifically, the transmission station 102 executes an encryption algorithm 808 on the link key 802. This time, the encryption algorithm 808 uses the client unique key 714 to encrypt the link key 802. The encrypted link key is then transmitted to the host receiver 130 which relays the encrypted link key to the client device 133.

Once the encrypted link key is received by the client device 133, the client 133 executes a decryption algorithm 810 on the encrypted link key using the client unique key 714. The unencrypted link key 802 may then be used by the client device 133 to decrypt the digital content 716. Once the content is received and decrypted by the client device 133, the client device 133 may send 718 the content to a display 132, such as a television.

Figure 10:
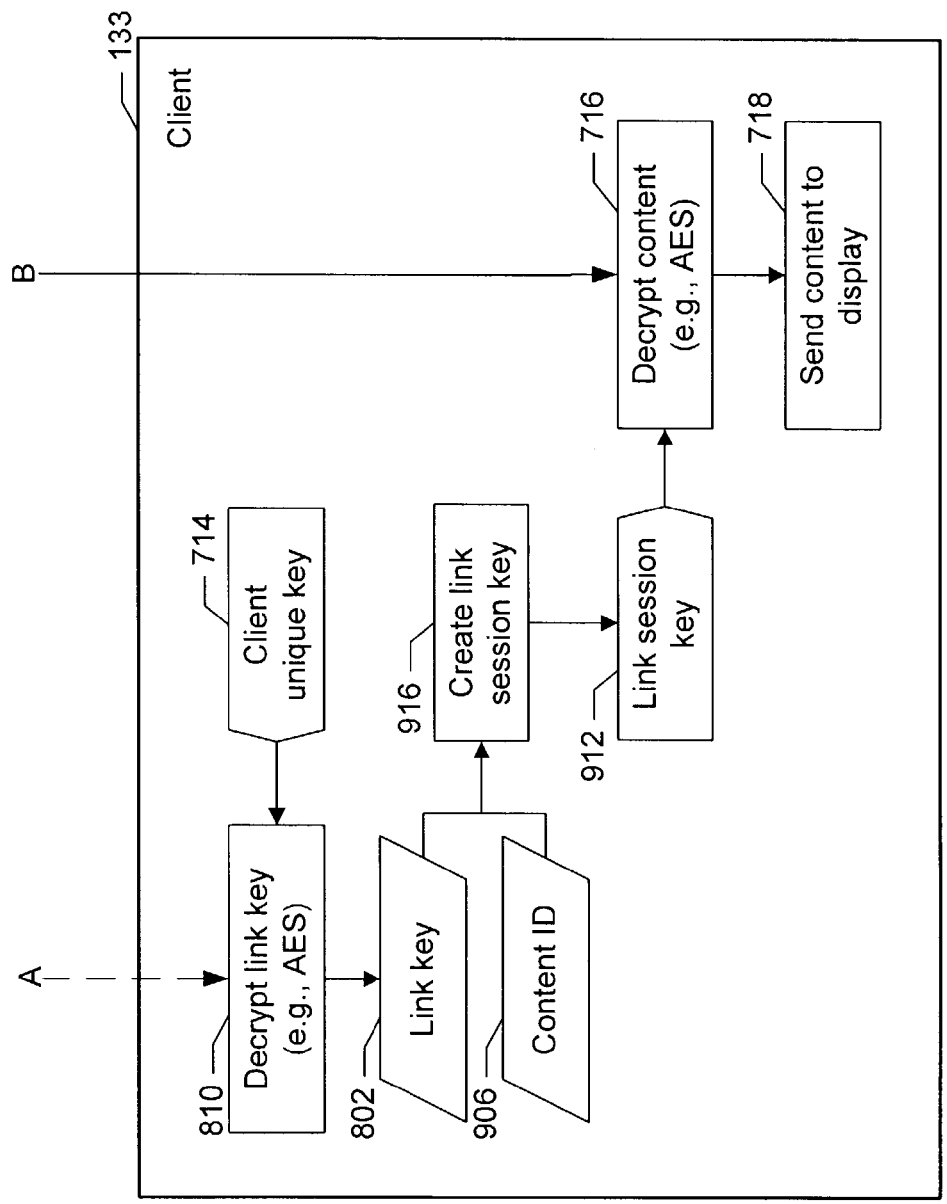

A block diagram of an example system using a session key to re-encrypt content is illustrated in FIGS. 9-10. Like the previous example, the transmission station 102 encrypts unencrypted content 702 by executing an encryption algorithm 704 on the unencrypted content 702. However, unlike the previous example, the encryption algorithm 704 uses a host session key 902 to encrypt the content.

The transmission station 102 executes an algorithm 904 to create the host session key 902. The session key generation algorithm 904 uses the host unique key 706 and a content identifier 906. The content identifier 906 is a digital string associated with the digital content. Preferably, the content identifier 906 is unique to the digital content 702. For example, the content identifier 906 may be a name and/or a serial number assigned to a movie or other digital content. The encrypted content is then transmitted to the host receiver 130 and stored on the hard-drive 708 (or any other memory device).

When the content needs to be sent to the client device 133, the host receiver 130 executes a decryption algorithm 710 on the encrypted content using the host session key 902. The host receiver 130 receives the host session key 902 from the transmission station 102. More specifically, the transmission station 102 executes an encryption algorithm 908 on the host session key 902. The encryption algorithm 908 uses the host unique key 706 to encrypt the host session key 902. The encrypted session key is then transmitted to the host receiver 130. Once the encrypted session key is received by the host receiver 130, the host receiver 130 executes a decryption algorithm 910 on the encrypted session key using the host unique key 706. The unencrypted session key 902 may then be used by the host receiver 130 to execute the decryption algorithm 710 on the encrypted digital content.

Unlike the previous example, the host receiver 130 then re-encrypts the content by executing an encryption algorithm 712 on the unencrypted content using a link session key 912. The host receiver 130 executes an algorithm 914 to create the link session key 912. The link session key generation algorithm 914 uses a link key 802 and the content identifier 906. The host receiver 130 receives the link key 802 from the transmission station 102. More specifically, the transmission station 102 executes an encryption algorithm 804 on the link key 802. The encryption algorithm 804 uses the host unique key 706 to encrypt the link key 802. The encrypted link key is then transmitted to the host receiver 130. Once the encrypted link key is received by the host receiver 130, the host receiver 130 executes a decryption algorithm 806 on the encrypted link key using the host unique key 706. The unencrypted link key 802 may then be used by the host receiver 130 to execute the algorithm 914 to create the link session key 912. Subsequently, the host receiver 130 may re-encrypt the content by executing the encryption algorithm 712 on the unencrypted content using the link session key 912.

The encrypted content is then sent to the client device 133, and the client device 133 executes a decryption algorithm 716 on the encrypted content using the link session key 912. Of course, an asymmetric pair of encryption keys could also be used to encrypt and decrypt the content. The client device 133 executes an algorithm 916 to create the link session key 912. The link session key generation algorithm 916 uses the link key 802 and the content identifier 906.

Like the host receiver 130, the client device 133 receives the link key 802 from the transmission station 102. However, the client device 133 receives the link key 802 indirectly via the host receiver 130. More specifically, the transmission station 102 executes an encryption algorithm 808 on the link key 802. This time, the encryption algorithm 808 uses the client unique key 714 to encrypt the link key 802. The encrypted link key is then transmitted to the host receiver 130 which relays the encrypted link key to the client device 133. Once the encrypted link key is received by the client device 133, the client device 133 executes a decryption algorithm 810 on the encrypted link key using the client unique key 714.

The unencrypted link key 802 may then be used by the client device 133 to execute the algorithm 916 to create the link session key 912. Subsequently, the client device 133 may decrypt the content by executing the decryption algorithm 716 on the encrypted content using the link session key 912. Once the content is received and decrypted by the client device 133, the client device 133 may send 718 the content to a display 132, such as a television.

Although certain apparatus have been described herein, the scope of coverage of this patent is not limited thereto. On the contrary, this patent covers all apparatuses, methods and articles of manufacture fairly falling within the scope of the appended claims either literally or under the doctrine of equivalents.

What is claimed is:

1. A method of distributing an encrypted digital content via a direct-to-home satellite host receiver, the method comprising:
   receiving the digital content from a satellite;
   storing the digital content in the host receiver;
   determining that a client device should store the digital content at the host receiver;
   decrypting the digital content using a first key associated with the host receiver;
   encrypting the digital content using a second key associated with the client device; and transmitting the digital content encrypted with the second key to the client device.

2. A method as defined in claim 1, wherein receiving the digital content from a satellite comprises receiving the digital content from a geostationary satellite via a direct-to-home satellite dish.

3. A method as defined in claim 1, wherein storing the digital content in the host receiver comprises storing digital content indicative of a video signal and an audio signal on a hard disk drive.

4. A method as defined in claim 1, wherein determining that a client device should store the digital content comprises receiving a request from the client device.

5. A method as defined in claim 1, further comprising:
   receiving a unique identifier from the client device;
   transmitting the unique identifier to a transmission station; and
   receiving the second key from the transmission station.

6. A method as defined in claim 5, wherein receiving the second key from the transmission station comprises decrypting the second key using the first key.

7. A method as defined in claim 5, wherein receiving the second key from the transmission station comprises receiving the second key via the satellite.

8. A method as defined in claim 6, further comprising:
   receiving a copy of the second key from the transmission station, wherein the copy of the second key is encrypted by a third key associated with the client device; and
   transmitting the copy of the second key encrypted by the third key to the client device.

9. A method as defined in claim 8, wherein encrypting the digital content using a second key associated with the client device comprises encrypting the digital content using the second key and an identifier associated with the digital content.

10. A method as defined in claim 1, wherein encrypting the digital content using a second key associated with the client device comprises encrypting the digital content using the second key and an identifier associated with the digital content.

11. A method as defined in claim 1, wherein the host receiver is located in a household and transmitting the digital content to the client device comprises transmitting the digital content within the household.

12. A method as defined in claim 1, wherein the client device does not include a tuner.

13. A method as defined in claim 1, wherein the client device does not include a conditional access smartcard.

14. A method as defined in claim 1, wherein the client device does not include a satellite feed.

15. A method as defined in claim 1, wherein the client device does not include a hard disk.

16. A direct-to-home satellite host receiver comprising: a satellite tuner;
   a controller operatively coupled to the satellite tuner;
   a digital storage device operatively coupled to the controller; and
   a client connection operatively coupled to the controller, the controller being structured to:
   cause an encrypted digital content to be received using the satellite tuner;
   cause the digital content to be stored on the digital storage device;
   cause the digital content to be decrypted using a first key associated with the host receiver;
   cause the digital content to be encrypted using a second key associated with a client device; and
   cause the digital content to be transmitted via the client connection.

17. A host receiver as defined in claim 16, wherein the controller comprises at least one of a microprocessor, a memory, a logic circuit, an encryption circuit, and a decryption circuit.

18. A host receiver as defined in claim 16, wherein the controller is structured to receive a request for the digital content from the client device.

19. A host receiver as defined in claim 16, wherein the controller is structured to:
   receive a unique identifier from the client device;
   transmit the unique identifier to a transmission station; and
   receive the second key from the transmission station.

20. A host receiver as defined in claim 19, wherein the controller is structured to decrypt the second key using the first key.

21. A host receiver as defined in claim 20, wherein the controller is structured to:
   receive a copy of the second key from the transmission station, wherein the copy of the second key is encrypted by a third key associated with the client device; and
   transmit the copy of the second key encrypted by the third key to the client device.

22. A host receiver as defined in claim 21, wherein the controller is structured to encrypt the digital content using an identifier associated with the digital content.

23. A method of distributing digital content from a transmission station, the method comprising:
   receiving a first unique identifier associated with a host receiver at the transmission station;
   determining a first key associated with the host receiver using the first unique identifier;
   encrypting the digital content using the first key;
   transmitting the digital content encrypted using the first key to the host receiver;
   receiving a second unique identifier associated with a client device;
   determining a second key associated with the client device using the second unique identifier, the second key being different than the first key;
   encrypting the second key associated with a client device using the first key associated with the host receiver; and
   transmitting the second key encrypted using the first key to the host receiver.

24. A method as defined in claim 23, further comprising encrypting the digital content using the second key; and transmitting the digital content encrypted using the second key to the host receiver.

25. A method as defined in claim 24, wherein encrypting the digital content using the second key comprises encrypting the digital content using the second key and an identifier associated with the digital content.

26. A method as defined in claim 23, wherein a transmitting the second key to the host receiver comprises transmitting the second key from a geostationary satellite to a direct-to-home satellite dish.

27. A transmission station comprising:
a control station;
a network connection operatively coupled to the control station;
a transmitter operatively coupled to the control station; and
an audio/video program source operatively coupled to the control station, the audio/video program source storing digital content, the control station being structured to:
receive a first unique identifier associated with a host receiver via the network connection;
determine a first key associated with the host receiver using the first unique identifier;
encrypt the digital content using the first key;
transmit the digital content encrypted using the first key to the host receiver via the transmitter;
receive a second unique identifier associated with a client device via the network connection;
determine a second key associated with the client device using the second unique identifier, the second key being different than the first key;
encrypt the second key associated with a client device using the first key associated with the host receiver; and
transmit the second key encrypted using the first key to the host receiver via the transmitter.

28. A transmission station as defined in claim 27, wherein the transmitter comprises a direct-to-home satellite transmitter.

29. A transmission station as defined in claim 27, wherein the control station comprises at least one of a microprocessor, a memory, a logic circuit, an encryption circuit, and a decryption circuit.

30. A transmission station as defined in claim 27, wherein the control station is structured to:
encrypt the digital content using the second key; and
transmit the digital content encrypted using the second key to the host receiver via the transmitter.

31. A transmission station as defined in claim 30, wherein the control station is structured to encrypt the digital content using the second key and an identifier associated with the digital content.

32. A method of displaying digital content via a client device, the method comprising:
transmitting a request for digital content to a host receiver;
receiving an encrypted digital content at the client device from the host receiver;
decrypting the digital content using a first key associated with the client device and an identifier associated with digital content; and
transmitting the digital content to a display device;
wherein the client device does not include a satellite feed.

33. A method as defined in claim 32, wherein transmitting a request for digital content to a host receiver comprises transmitting a request for digital content to a direct-to-home satellite host receiver.

34. A method as defined in claim 32, further comprising transmitting a unique identifier to the host receiver.

35. A method as defined in claim 32, wherein the client device does not include conditional access smartcard.

36. A method as defined in claim 35, wherein the client device does not include a hard disk.

37. A method as defined in claim 36, wherein the client device does not include a tuner.

38. A method as defined in claim 32, further comprising:
receiving the digital content at the host receiver from a satellite;
storing the digital content in the host receiver;
decrypting the digital content at the host receiver using a second key associated with the host receiver;
encrypting the digital content at the host receiver using the first key associated with the client device; and
transmitting the digital content encrypted with the first key to the client device.

39. A method as defined in claim 38, further comprising:
receiving a first unique identifier associated with the host receiver at a transmission station;
determining the second key associated with the host receiver using the first unique identifier;
encrypting the digital content using the second key;
transmitting the digital content encrypted using the second key to the host receiver;
receiving a second unique identifier associated with the client device;
determining the first key associated with the client device using the second unique identifier;
encrypting the first key associated with the client device using the second key associated with the host receiver; and
transmitting the first key encrypted using the second key to the host receiver.

40. A direct-to-home satellite client device comprising:
a digital input; an audio output; a video output; and
a first controller operatively coupled to the digital input, the audio output, and the video output, the first controller being structured to cause an encrypted digital content to be received from the digital input, the first controller being structured to cause the digital content to be decrypted, the first controller being structured to cause an audio signal based on the digital content to be transmitted via the audio output, the first controller being structured to cause a video signal based on the digital content to be transmitted via the video output;
the client device lacking a satellite feed and a conditional access smartcard.

41. A client device as defined in claim 40, wherein the first controller comprises at least one of a microprocessor, a memory, a logic circuit, an encryption circuit, and a decryption circuit.

42. A client device as defined in claim 40, wherein the video output comprises the audio output.

43. A client device as defined in claim 42, wherein the first controller is structured to cause a request for the digital content to be transmitted to a direct-to-home satellite host receiver.

44. A client device as defined in claim 42, wherein the first controller is structured to:
cause a first encryption key to be decrypted using a second encryption key; and
cause the digital content to be decrypted using the first encryption key.

45. A client device as defined in claim 40, wherein the first controller is structured to cause the digital content to be decrypted using an identifier of the digital content.

46. A client device as defined in claim 40, wherein the first controller is structured to cause a unique identifier associated with the client device to be transmitted to a direct-to-home satellite host receiver.

47. A client device as defined in claim 40, lacking a satellite tuner and a hard disk drive.

48. A client device as defined in claim 42, further comprising a direct-to-home satellite host receiver, the host receiver comprising:
- a satellite tuner;
- a second controller operatively coupled to the satellite tuner;
- a digital storage device operatively coupled to the second controller; and
- a client connection operatively coupled to the second controller, the second controller being structured to:
  - cause digital content to be received using the satellite tuner;
  - cause the digital content to be stored on the digital storage device;
  - cause the digital content to be decrypted using a first key associated with the host receiver;
  - cause the digital content to be encrypted using a second key associated with the client device; and
  - cause the digital content to be transmitted via the client connection.

49. A client device as defined in claim 48, further comprising a digital content providing apparatus, the digital content providing apparatus comprising:
- a third controller,
- a receiver operatively coupled to the third controller;
- a direct-to-home satellite transmitter operatively coupled to the third controller; and
- a digital storage device operatively coupled to the third controller, the digital storage device storing digital content, the third controller being structured to:
  - receive a first unique identifier associated with the host receiver via the receiver;
  - determine a first key associated with the host receiver using the first unique identifier;
  - encrypt the digital content using the first key;
  - transmit the digital content encrypted using the first key to the host receiver via the direct-to-home satellite transmitter;
  - receive a second unique identifier associated with the client device via the receiver;
  - determine a second key associated with the client device using the second unique identifier, the second key being different than the first key;
  - encrypt the second key associated with a client device using the first key associated with the host receiver; and
  - transmit the second key encrypted using the first key to the host receiver via the direct-to-home satellite transmitter.

* * * * *